US 8,000,606 B2

(12) United States Patent
Xiao et al.

(10) Patent No.: US 8,000,606 B2
(45) Date of Patent: Aug. 16, 2011

(54) METHOD FOR PROCESSING OVERHEADS OF OPTICAL COMMUNICATION SYSTEM AND SIGNAL PROCESSING DEVICE

(75) Inventors: Xinhua Xiao, Guangdong (CN); Chengyu Huang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 786 days.

(21) Appl. No.: 10/588,394

(22) PCT Filed: Dec. 14, 2004

(86) PCT No.: PCT/CN2004/001452
§ 371 (c)(1),
(2), (4) Date: Mar. 17, 2008

(87) PCT Pub. No.: WO2005/076501
PCT Pub. Date: Aug. 18, 2005

(65) Prior Publication Data
US 2008/0205891 A1     Aug. 28, 2008

(30) Foreign Application Priority Data
Feb. 4, 2004   (CN) .......................... 2004 1 0005145

(51) Int. Cl.
*H04J 14/08* (2006.01)
(52) U.S. Cl. ................ 398/98; 398/99; 398/100; 398/3; 398/5; 398/175; 398/155; 398/7; 398/8; 398/33; 398/177; 370/535; 370/375; 370/428; 370/474; 370/907
(58) Field of Classification Search .................... 398/98, 398/99, 100, 79, 58, 59, 83, 45, 46, 47, 48, 398/49, 50, 51, 52, 53, 54, 55, 56, 140, 141, 398/135, 173, 174, 175, 179, 177, 176, 180, 398/181, 33, 75, 155; 370/392, 389, 466, 370/503, 505, 539, 474, 221, 222, 223, 224, 535, 906, 907, 375, 428, 536, 476, 376, 541, 542

See application file for complete search history.

(56) References Cited

U.S. PATENT DOCUMENTS 6,130,764 A * 10/2000 Taniguchi ........................ 398/1

(Continued)

FOREIGN PATENT DOCUMENTS

| CN | 1303185 | 7/2001 |
|---|---|---|
| CN | 1303185 A | 7/2001 |
| WO | WO 03/003629 | 1/2003 |

OTHER PUBLICATIONS

International Search Report for PCT/CN2004/001452, mailed Mar. 10, 2005.

(Continued)

*Primary Examiner* — Hanh Phan
(74) *Attorney, Agent, or Firm* — Slater & Matsil, L.L.P.

(57) ABSTRACT

A method for processing overheads in an optical communication system and a signal processing device are disclosed. The method includes: in a receiving direction, conduct an O/E and S/P conversion for the received optical signal, extract overheads necessary for overheads processing; transmit the overheads in serial; conduct an S/P conversion of the overheads, add fixed reserved overheads, and revert the parallel overheads for overheads processing; in a transmitting direction, generate parallel overheads, extract overheads necessary for overheads processing; transmit the overheads in serial; conduct an S/P conversion of the overheads, revert the overheads, synthesize the overheads with the payload data before the P/S and E/O conversion, and generate and transmit the optical signal. In accordance with the disclosed method and device, a serial bus is employed to transmit overheads, which reduces the number of buses on the motherboard and lowers the complexity of system design.

13 Claims, 5 Drawing Sheets

U.S. PATENT DOCUMENTS

| | | | | |
|---|---|---|---|---|
| 6,314,097 | B1 * | 11/2001 | Ohara | 370/392 |
| 6,594,047 | B1 * | 7/2003 | Ballintine et al. | 398/79 |
| 7,058,298 | B2 * | 6/2006 | Koyano et al. | 398/17 |
| 2002/0126712 | A1 | 9/2002 | Mueller | |

OTHER PUBLICATIONS

Guo et al., "A New Method of SDH Overhead Processing," *Study of Optical Communications*, 4(118):13-17 (2003).

Meng et al., "The Application Specific Integrated Circuit Design of SDH Overhead Processing," *ASIC Design Center of Xi'an Institute of Posts and Telecommunications* (2001).

Xu et al., "The ASIC Design of SDH Overhead Processing," *Study of Optical Communications*, 1(97):46-48 (2000).

Partial Translation of First Chinese Office Action for Application No. 2004100051457, dated Apr. 17, 2009.

Written Opinion for Application No. PCT/CN2004/001452, dated Mar. 10, 2005.

* cited by examiner

METHOD FOR PROCESSING OVERHEADS OF OPTICAL COMMUNICATION SYSTEM AND SIGNAL PROCESSING DEVICE

CROSS REFERENCES TO RELATED APPLICATIONS

This application is the national phase of International Application No. PCT/CN2004/001452, which was filed on Dec. 14, 2004, and which, in turn, claimed the benefit of Chinese Patent Application No. 200410005145.7, which was filed on Feb. 4, 2004, the entire disclosures of which are hereby incorporated by reference.

FIELD OF THE TECHNOLOGY

The present invention relates to Synchronous Digital Hierarchy (SDH), Synchronous Optical Network (SONET) communication technology, and more particular, to a method for processing overheads of an SDH/SONET system as well as a signal processing device based on this method.

BACKGROUND OF THE INVENTION

At present, SDH/SONET has been widely used in a backbone layer of a transport network. As advantages such as a perfect network equipment management function, a powerful networking ability, and a strong network self-healing ability possessed by an SDH/SONET system are all implemented via overheads in the frame thereof, transmission and processing of the overheads are of great significance for the transmission of SDH/SONET signals.

FIG. 1 is a schematic diagram illustrating a signal processing device of an SDH/SONET system. As shown in FIG. 1, the SDH/SONET signal processing device includes the following modules:

a signal processing unit 200, for receiving or transmitting SDH/SONET optical signals, and implementing the separation and synthesis of payload data and overheads of an SDH/SONET signal;

a payload data processing unit 300, for receiving and processing the SDH/SONET payload data separated by the signal processing unit 200, or generating payload data to be transmitted, and transmitting the payload data to be transmitted to the signal processing unit 200; and an overhead processing unit 400, for receiving and processing the SDH/SONET overheads separated by the signal processing unit 200, or generating the overheads to be transmitted, and transmitting the overheads to the signal processing unit 200.

It should be noted that, typically, the signal processing unit 200, the payload data processing unit 300, and the overhead processing unit 400 of an SDH/SONET signal processing device are deployed in different hardware daughter boards of a system device, and such hardware daughter boards are interconnected via a motherboard. Therefore, a payload data bus between unit 200 and unit 300 as well as an overhead bus between unit 200 and unit 400 are both implemented through buses on the system motherboard.

Internal structures of the signal processing unit 200 and the overhead processing unit 400 are further described hereinafter. Wherein, the signal processing unit 200 further includes:

an optical receiving module 201, for performing an O/E (optical/electrical) conversion of an SDH/SONET signal;

an optical transmitting module 202, for performing an E/O (electrical/optical) conversion of an SDH/SONET signal;

a serial/parallel conversion module 203, for performing a S/P (serial/parallel) conversion of an SDH/SONET electrical signal;

a parallel/serial conversion module 204, for performing a P/S (parallel/serial) conversion of an SDH/SONET electrical signal;

a signal processing module 205, for performing a separation or a synthesis of the overheads and the payload data;

a receiving overhead storage 207 and a transmitting overhead storage 208 for storing the overheads;

an overhead output module 209, for transmitting the overheads to the overhead processing unit 400; and an overhead input module 210, for receiving the overheads from the overhead processing unit 400.

Wherein, the overhead processing unit 400 further includes:

a receiving overhead processing module 401, for processing received overheads; and a transmitting overhead processing module 402 for generating overheads to be transmitted.

The full working flow of the above SDH/SONET signal processing device is described hereinafter in detail.

The signal processing procedure of the signal processing device in the receiving direction is as follows: after receiving an SDH/SONET optical signal, the optical receiving module 201 implements an O/E conversion first, and then transmits the electrical signal to the serial/parallel conversion module 203; After implementing an S/P conversion, the serial/parallel conversion module 203 transmits the outputted parallel SDH/SONET electrical signals to the signal processing module 205; the signal processing module 205 separates the overheads from the payload data of the parallel SDH/SONET electrical signals, submits the payload data to the payload data processing unit 300 for processing via the payload data bus, and outputs the separated Section OverHead (SOH) or Path OverHead (POH) to the receiving overhead storage 207; after extracting the stored overheads from the receiving overhead storage 207, the overhead output module 209 generates a frame header signal and a timing signal corresponding to the overheads, then the overhead output module 209 outputs the frame header signal and the timing signal via a parallel overhead bus on the system motherboard, to the receiving overhead processing module 401 of the overhead processing unit 400 for processing.

The signal processing procedure of the signal processing device in the transmitting direction by the signal processing device is as follows: when a signal is to be transmitted, the transmitting overhead processing module 402 of the overhead processing unit 400 outputs generated overheads as well as a frame header and a timing signal corresponding to the overheads to the overhead input module 210 of the signal processing unit 200 via the parallel overhead bus on the system motherboard; the overhead input module 210 transmits the received parallel overheads to the transmitting overhead storage 208; after extracting the parallel overheads from the transmitting overhead storage 208, the signal processing module 205 synthesizes the extracted overheads with payload data from the payload processing unit 300, generates a set of parallel SDH/SONET electrical signals, and then transmits the parallel signals to the parallel/serial conversion module 204; the parallel/serial conversion module 204 converts the parallel SDH/SONET electrical signals into a serial signal, and then transmits the serial signal to the electrical/optical conversion module 202; finally, the electrical/optical conversion module 202 conducts an E/O conversion for the received serial signal before sending the converted signal to an optical fibre.

As overheads of an SDH/SONET frame perform OAM (Operation, Administration and Maintenance) functions of the SDH/SONET system, it is of great significance to transmit the overheads from the signal processing unit 200 to the overhead processing unit 400 timely, safely and reliably. At present, no specific protocol has been put forward on the specification of this overhead bus while each manufacturer gives the definition of the overhead bus based on its own specifications. Moreover, as the volume of overheads of an SDH/SONET frame is large, a high-speed parallel bus on the system motherboard needs to be employed such that all the overheads in the frame structure of SDH/SONET could be transmitted to the overhead processing unit for processing. Meanwhile, in order to implement the receiving alignment of overheads on the high-speed parallel bus, it needs to insert channel associated system timing and frame-header signals in the parallel overhead bus. This, however, will result in numerous buses on the system motherboard, which increases the complexity and difficulty of system design. Moreover, it impossible to conduct bit error detection using the above signal processing device, which is unfavourable for locating system failures, thus the transmission safety of system overheads can not be guaranteed.

SUMMARY

The present invention provides a method for processing overheads of an SDH/SONET system such that overhead buses with a smaller bandwidth could be employed to transmit overheads and the complexity of the system design could be reduced.

The present invention also provides a signal processing device of an SDH/SONET system, which could reduce the number of buses on the system motherboard, and reduce the complexity and difficulty of system design.

The method for overheads processing in accordance with the present invention includes the following steps:

in the signal receiving direction:

conducting an O/E conversion, an S/P conversion for the received optical signal, separating parallel overheads from the optical signal, extracting overheads necessary for overhead processing, conducting a P/S conversion, generating and outputting a serial overhead frame to output;

receiving the serial overhead frame outputted, conducting an S/P conversion for the serial overheads in the received frame, inserting fixed reserved overheads, and reverting parallel overheads for overheads processing; and in the signal transmitting direction:

generating parallel overheads to be transmitted, extracting overheads necessary for overheads processing from the generated overheads, conducting a P/S conversion, generating and outputting a serial overhead frame;

receiving the serial overhead frame outputted, conducting an S/P conversion for the serial overheads in the received frame, inserting fixed reserved overheads, reverting the parallel overheads, combining the overheads with the payload data of the system, conducting a P/S conversion, an E/O conversion, generating and transmitting the generated optical signals.

The system signal processing device in accordance with the present invention includes:

a signal processing unit, for receiving or transmitting optical signals, and implementing a separation or synthesis for payload data and overheads in the signals;

a payload data processing unit, for processing the separated payload data or generating the payload data for transmission; and an overhead processing unit, for processing the separated overheads or generating the overheads for transmission;

a first pair of overhead transmitting interface conversion unit and overhead receiving interface conversion unit connected with both the signal processing unit and the overhead processing unit in parallel modes; wherein, the first pair of overhead transmitting interface conversion unit and overhead receiving interface conversion unit comprises a first overhead transmitting interface conversion unit and a first overhead receiving interface conversion unit, and the output of the first overhead transmitting interface conversion unit connects to the input of the first overhead receiving interface conversion unit through a serial overhead bus; wherein, the first overhead transmitting interface conversion unit is used for extracting overheads necessary for overheads processing from the inputted parallel overheads, conducting a parallel/serial conversion, generating serial overheads, and transmitting the serial overheads to the overhead receiving interface conversion unit; and the first overhead receiving interface conversion unit is used for receiving the serial overheads from the overhead transmitting interface conversion unit, conducting a serial/parallel conversion, inserting fixed reserved overheads, reverting the overheads into parallel overheads and outputting the parallel overheads.

As can be seen from the above description, the method for processing overheads of the SDH/SONET system and the signal processing device in accordance with the present invention can bring the following beneficial effects:

1. By serial transmitting or serial receiving the overheads, the method in accordance with the present invention greatly reduces the width of the overhead bus needed for transmitting overheads, thus reducing the complexity of system;

2. By transmitting overheads using a serial bus instead of the parallel bus in the prior art, the device in accordance with the present invention could reduce the number of buses on the system motherboard, thereby reducing the complexity and difficulty of the system design;

3. By checking the transmitted overheads, the method and device in accordance with the present invention further guarantee a safe transmission of overheads between the signal processing units and the overheads processing units located on different function boards;

4. While guaranteeing a safe transmission of the overheads, the method and device in accordance with the present invention make it convenient to locate a failure using the check code in the overheads and meanwhile to assess the severity of a failure;

5. By multiplexing multi-path overheads in a byte-interleaved mode, the method and device in accordance with the present invention ensure a multiplexed transmission of multi-path overheads and the transmission rate of overhead buses is greatly increased.

DETAILED DESCRIPTION OF THE PREFERRED EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention is hereinafter further described with reference to the accompanying drawings as well as embodiments.

In order to reduce the number of buses on the signal processing motherboard of the system and lower the complexity of design of an SDH/SONET system, a method for processing the overheads of an SDH/SONET system is provided, such that the overheads are transmitted between the signal processing unit and the overhead processing unit on different hardware daughter boards in a serial transmission mode instead of a parallel transmission mode according to the prior art, thereby reducing the number of buses between the signal processing unit and the overhead processing unit on the system motherboard. In addition, the method further includes the step of checking the overheads in the process of transmitting the overheads, thus the correctness of the overheads in the transmission process can be guaranteed.

Figure 1:
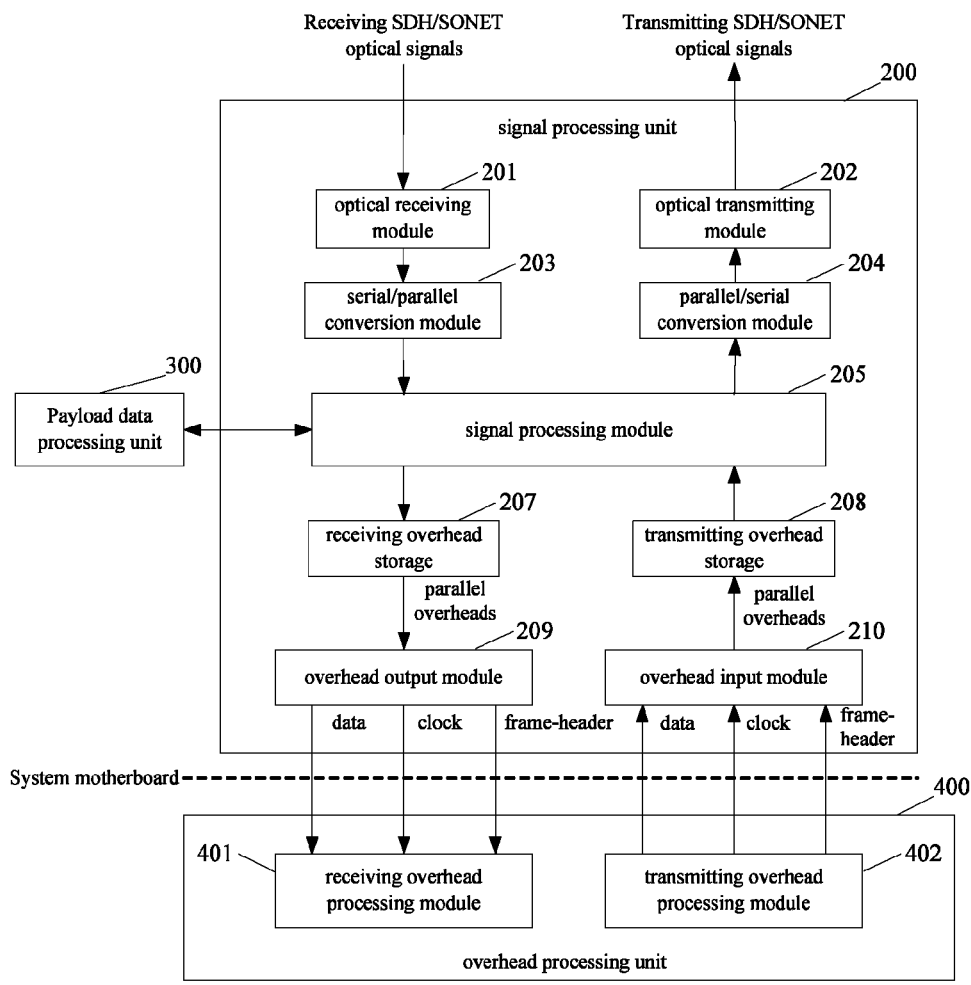
FIG. 1 is a schematic diagram illustrating a structure of a signal processing device of a SDH/SONET system in the prior art.
Figure 2:
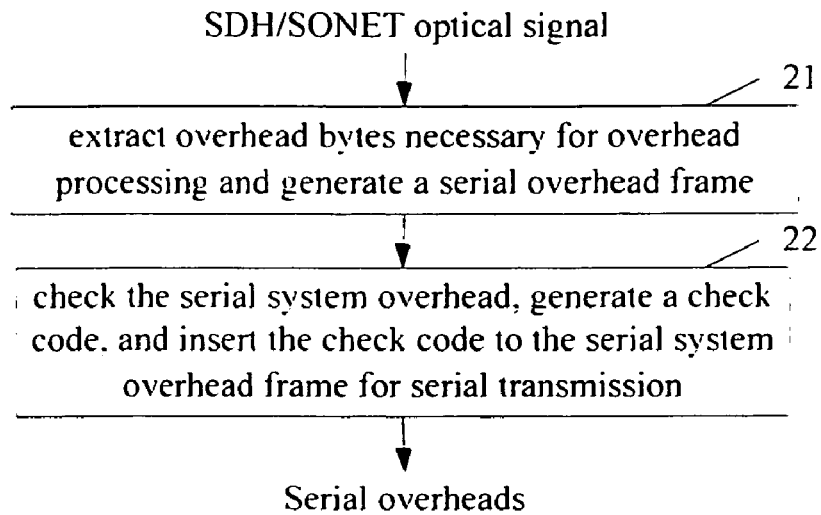
FIG. 2 is a flowchart illustrating a method for receiving signals by an SDH/SONET system signal processing unit in accordance with a preferred embodiment of the present invention.

FIG. 2 shows a procedure of receiving overheads by the signal processing unit of the SDH/SONET system. As shown in FIG. 2, after conducting an O/E conversion and an S/P conversion for the received SDH/SONET optical signals, a set of parallel electrical SDH/SONET signals is generated, and overheads on parallel mode are then separated from the parallel electrical signals, and after that, the following steps should be performed:

Step 21: extract overheads necessary for overheads processing from the separated parallel overheads, conduct a P/S conversion for the extracted overheads, and generate a serial overhead frame.

According to the SDH/SONET protocol, many undefined bytes are reserved in the section overhead of an SDH/SONET frame, and these reserved overheads are reserved for implementing extended functions of management and maintenance. If the system itself has not defined the contents of these reserved bytes, these bytes will not carry OAM information of the SDH/SONET system in the transmission process. Usually during the transmitting of SDH/SONET signals, these reserved bytes have fixed values set during initialization. Therefore, if the system has not defined these reserved bytes, the overheads processing procedure needs not process the information carried in these bytes, i.e. these reserved overheads are not overheads necessary for overheads processing. If the system has defined these reserved overheads, however, these bytes constitute part of the overheads necessary for overheads processing.

In addition, such overheads as A1 and A2 for frame alignment and B1 and B2 for bit error checking are used at the time of receiving SDH/SONET signals, and are cut-off by bottom-layer components of SDH/SONET devices. In the subsequent overheads processing procedure, the overhead processing device of the SDH/SONET system needs not process these bytes, either. Therefore, these overheads are not necessary for overheads processing.

Such overheads, however, as D1-D12 providing data communication channels, E1 and E2 providing voice channels for contacts of general usage service, K1 and K2 providing protection switching information, and etc., as well as some reserved overheads defined by the system itself, are mainly for carrying OAM information of the system, and these are overheads necessary for overhead processing.

Therefore, in this step, the above overheads carrying OAM information can be extracted, and then converted from parallel data to serial data before being transmitted to the overhead processing unit for further processing. Obviously, if the system has defined some reserved bytes or other bytes and the bytes need to be processed as overhead, these bytes should be extracted in this step as well.

The P/S conversion in this step includes specifically: inserting the extracted parallel overheads that carries the OAM information to a serial overhead frame according to a predetermined transmission format of the serial overhead frame, and converting each of the overheads into serial overheads in the order from high bit to low bit. The transmission format of the serial overhead frame is to be described in detail in the following preferred embodiments.

As can be seen from this step, on one hand, since only some overheads necessary for overhead processing are transmitted in the above overheads transmission process and the number of bytes to be transmitted is greatly reduced, the extracted parallel overheads can be converted into serial system overheads and transmitted to the overhead processing unit such that the method in the prior art for parallel transmitting overheads could be replaced. On the other hand, since the transmission rate of the above serial overheads is lower, the receiving end can synchronously receive the overheads based on the local system clock, thus no need to parallel transmit the channel associated clock signal and the frame-header signal.

Step 22: check the serial system overheads generated in Step 21, generate a check code, and insert the check code to the serial system overhead frame for serial transmission.

The overheads checking method used in this step is to be described in detail in the following preferred embodiments.

In the above method, as parallel overheads are converted to serial overheads for transmission, the number of buses is greatly reduced and the system design is less complex.

Figure 3:
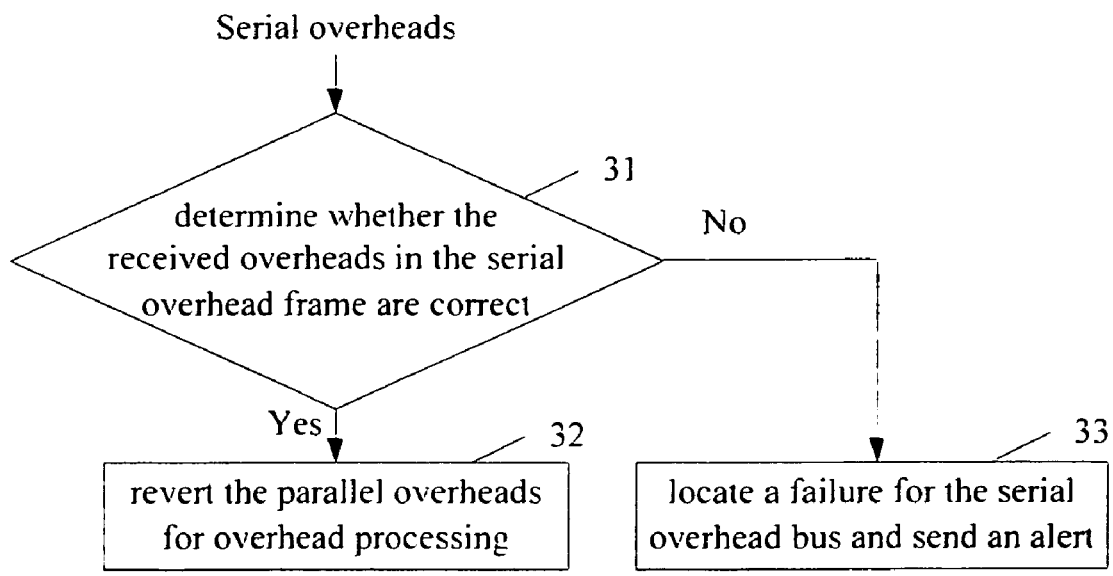
FIG. 3 is a flowchart illustrating a method for receiving overheads by an SDH/SONET overhead processing unit in accordance with a preferred embodiment of the present invention.

FIG. 3 shows a procedure of receiving overheads by the overhead processing unit of the SDH/SONET system. As shown in FIG. 3, the method for receiving overheads includes the following steps:

Step 31: after receiving the serial overhead frame outputted in the Step 22, determine whether the received overheads in the serial overhead frame are correct according to the check code in the serial overhead frame, if they are correct, proceed to Step 32; if they are not correct, proceed to Step 33;

Step 32: conduct an S/P conversion for the serial system overheads in the received serial overhead frame, insert fixed reserved overheads in the SDH/SONET frame, revert the parallel overheads for overhead processing, and terminate this procedure.

As above mentioned, in the process of SDH/SONET signals transmission, the reserved overheads in the SDH/SONET frame that have not been defined by the system can be set as fixed values. As a result, these fixed values need to be inserted in this step so as to revert the parallel overheads of the SDH/SONET system.

As to such overheads in the SDH/SONET frame as A1 and A2 for frame alignment, B1 and B2 for bit error check, as well as S1 for transmitting the information of synchronous status and etc, which are not received, these overheads should be inserted before transmission by the SDH/SONET system software or other bottom-layer modules. No consideration of the processing of these bytes is needed in the embodiments of the present invention.

Step 33: locate a failure for the serial overhead bus and send an alert.

Figure 4:
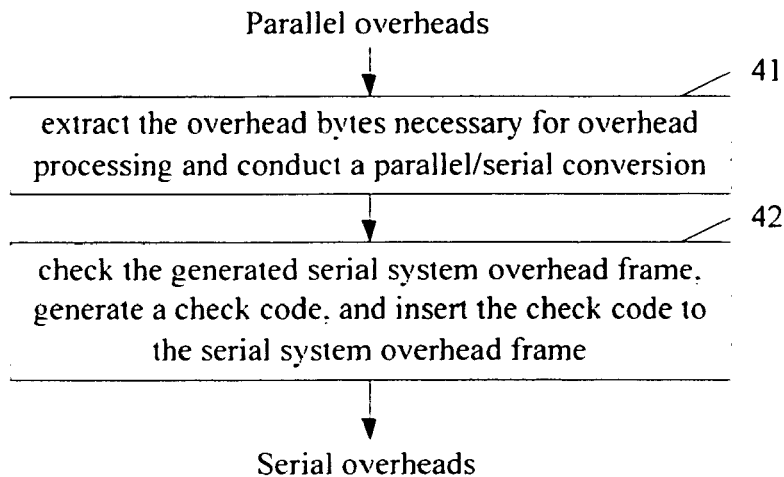
FIG. 4 is a flowchart illustrating a method for transmitting overheads by an SDH/SONET overhead processing unit in accordance with a preferred embodiment of the present invention.

FIG. 4 shows a procedure of transmitting overheads by the overhead processing unit of the SDH/SONET system. As shown in FIG. 4, the method for transmitting overheads includes the following steps:

Step 41: generate parallel system overheads, extract the overheads necessary for overheads processing from the parallel system overheads, conduct a P/S conversion for the extracted overheads, and generate a serial system overhead frame;

The method for extracting the overheads necessary for overheads processing and the method for P/S conversion are the same as the method described in Step 21.

Step 42: check the generated serial system overhead frame, generate a check code, and insert the check code into the serial system overhead frame for serial transmission.

Likewise, in this step, it is not needed to transmit on the system motherboard the channel associated clock signal and the frame-header.

Figure 5:
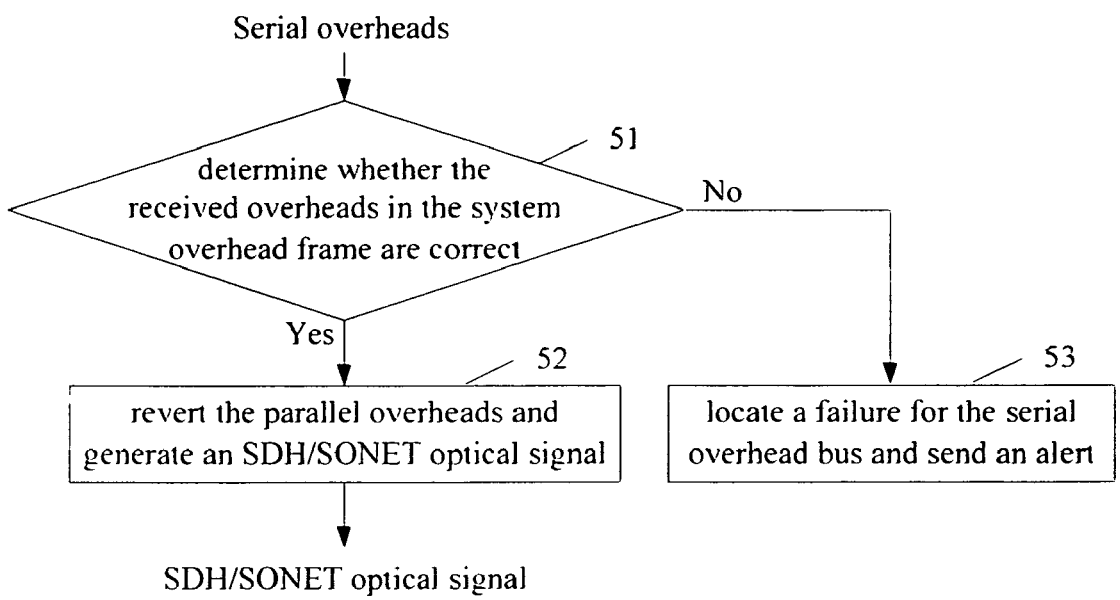
FIG. 5 is a flowchart illustrating a method for transmitting signals by an SDH/SONET system signal processing unit in accordance with a preferred embodiment of the present invention.

FIG. 5 shows a procedure of transmitting signals by the signal processing unit of the SDH/SONET system. As shown in FIG. 5, the method for transmitting the signal includes the following steps:

Step 51: after receiving the serial overhead frame outputted in the Step 42, determine whether the received overheads in the system overhead frame are correct according to the check code in the serial overhead frame, if they are correct, proceed to Step 52; if they are not correct, proceed to Step 53;

Step 52: conduct an S/P conversion for the received serial overheads in the serial overhead frame, insert fixed reserved overheads in the SDH/SONET frame, revert the parallel overheads, synthesize the overheads with the payload data, generate a set of parallel SDH/SONET signals, generate an SDH/SONET optical signal by a P/S conversion and an E/O conversion for transmission to an optical fibre, and terminate this procedure.

Step 53: locate a failure for the serial overhead bus and send an alert.

In the above method for processing signals of the SDH/SONET system, a serial mode of transmission instead of a parallel mode is adopted to transmit overheads using the serial overhead bus on the system motherboard. As a result, the number of buses between the signal processing unit and the overhead processing unit is reduced while the safety of overhead transmission is guaranteed by a checking mechanism.

One preferred embodiment in accordance with the present invention presents a transmission format of serial overheads. In this embodiment, suppose that the overheads of each STM-1 signal are transmitted by a serial overhead frame with a rate of 2 Mb/s and in the format similar to that of the Pulse Coded Modulation (PCM) serial data frame. This serial overhead frame includes 32 time slots. Each time slot includes 8 bits and can carry one byte of overheads. Therefore, this serial overhead frame can transmit up to 32 overheads, which may include the overheads necessary for overhead processing, such as voice channel information, user channel information, communication channel information, automatic protection switching information, a check code and etc. The serial overhead frame in this embodiment is transmitted via the serial bus on the system motherboard between the signal processing unit and the overhead processing unit.

Table 1 shows the position of each overhead byte in the serial data frame transmitted in a preferred embodiment of the present invention. In the P/S conversion process as described in the above Steps 21 and 41, insert the extracted overheads carrying OAM information in the serial data frame in the order as shown in the table below, and each of the overheads is converted into serial overheads in the order of high bit first and low bit last.

TABLE 1

| Slot position | Byte name |
| --- | --- |
| 00 | E1 |
| 01 | F1 |
| 02 | D1 |
| 03 | D2 |
| 04 | D3 |
| 05 | |
| 06 | |
| 07 | K1 |
| 08 | K2 |
| 09 | D4 |
| 10 | |
| 11 | D5 |
| 12 | D6 |
| 13 | D7 |
| 14 | D8 |
| 15 | D9 |
| 16 | D10 |
| 17 | D11 |
| 18 | D12 |
| 19 | |
| 20 | E2 |
| 21 | configurable |
| 22 | configurable |
| 23 | configurable |
| 24 | configurable |
| 25 | configurable |
| 26 | configurable |
| 27 | configurable |
| 28 | configurable |
| 29 | configurable |
| 30 | configurable |
| 31 | check code |

The definition of overheads in each time slot is the same as that of the overheads with identical name in the SDH protocol. The configurable bytes include extraction and insertion of any byte in SDH, the position of which can be set via a register. The blank slots can be defined by the user so as to output some overheads needed by the user itself. The check code in Slot 31 is for carrying the check code obtained after checking the overheads.

It should be noted that, although the structure shown in Table 1 defines the structure of the serial overhead frame for STM-1, those skilled in the art should understand that the serial frame structure that can be employed is not limited to the frame structure shown in Table 1, instead, it can be flexibly configured by personnel of system design in accordance with the practical situation, thus may include various changes and variations, which should be all covered in the protection scope of the present invention.

In addition, in order to provide multiple optical ports with different rates in a SDH/SONET system for the convenience of a user to make a networking choice, in the signal processing method according to an embodiment of the present invention, the overheads of each STM-1 signal is transmitted on a serial overhead bus with a rate of 2 Mb/s while the overheads of multi-path STM-1 can be multiplexed into one path of serial overheads in a byte-interleaved mode so as to be transmitted with a higher rate on the serial overhead bus. Furthermore, each overhead byte of the overheads transmitted on the serial overhead bus is set in the order from the highest bit to the lowest bit. For example, the overheads of one path of STM-1 signal is transmitted on the serial overhead bus with a rate of 2 Mb/s, and at this time, the overhead bus may refer to a 2 Mb/s serial overhead bus; the overheads of 4 paths STM-1 signals, after byte-interleaved, should be transmitted on the serial overhead bus with a rate of 8 Mb/s, and at this time the overhead bus may refer to an 8 Mb/s serial overhead bus. It should be noted that the transmission rate of overheads on the above serial overhead bus can be defined by the system based on the demands of different systems. The present invention puts no limit on the transmission rate of the serial bus.

An example in which the rate of the serial overhead bus is 8 Mb/s is hereinafter given to describe the byte-interleaved mode in accordance with the embodiment.

The serial overhead bus with a rate of 8 Mb/s is obtained by multiplexing 4 paths of 2 Mb/s overhead bus in the byte-interleaved mode, wherein the 4 paths of 2 Mb/s overhead bus are denoted as A, B, C, and D, respectively. The frame structure of the above 8 Mb/s serial overhead bus is as follows:

TABLE 2

| Slot position | Byte name |
| --- | --- |
| 00:[A:D] | E1 |
| 01:[A:D] | F1 |
| 02:[A:D] | D1 |
| 03:[A:D] | D2 |
| 04:[A:D] | D3 |
| 05:[A:D] | |
| 06:[A:D] | |
| 07:[A:D] | K1 |
| 08:[A:D] | K2 |
| 09:[A:D] | D4 |
| 10:[A:D] | |
| 11:[A:D] | D5 |
| 12:[A:D] | D6 |
| 13:[A:D] | D7 |
| 14:[A:D] | D8 |
| 15:[A:D] | D9 |
| 16:[A:D] | D10 |
| 17:[A:D] | D11 |
| 18:[A:D] | D12 |
| 19:[A:D] | |
| 20:[A:D] | E2 |
| 21:[A:D] | configurable |
| 22:[A:D] | configurable |
| 23:[A:D] | configurable |
| 24:[A:D] | configurable |
| 25:[A:D] | configurable |
| 26:[A:D] | configurable |
| 27:[A:D] | configurable |

TABLE 2-continued

| Slot position | Byte name |
| --- | --- |
| 28:[A:D] | configurable |
| 29:[A:D] | configurable |
| 30:[A:D] | configurable |
| 31:[A:D] | ID |

Wherein the configurable bytes include the extraction and insertion of any bytes in the section overheads, the appropriate position of which can be set via the register; the blank slots can be defined by the system itself so as to output some overheads needed by the user; and ID is the characteristic slot of the overhead bus, for configuring the type, number, and check bits of an optical port.

When the overheads are transmitted by the 8 Mb/s serial overhead bus above mentioned, if there is only one optical port on the function board, it can be specified that only path A is occupied by overheads, while the time slots of paths B, C, and D are used for transparently transmitting other overheads or reserved as unused; if there are two optical ports on the function board, it can be specified that paths A and B are occupied by overheads, while the time slots of paths C and D are used for transparently transmitting other overheads or reserved as unused; if there are 4 optical ports on the function board, paths A, B, C, and D will be all occupied by overheads.

Figure 6:
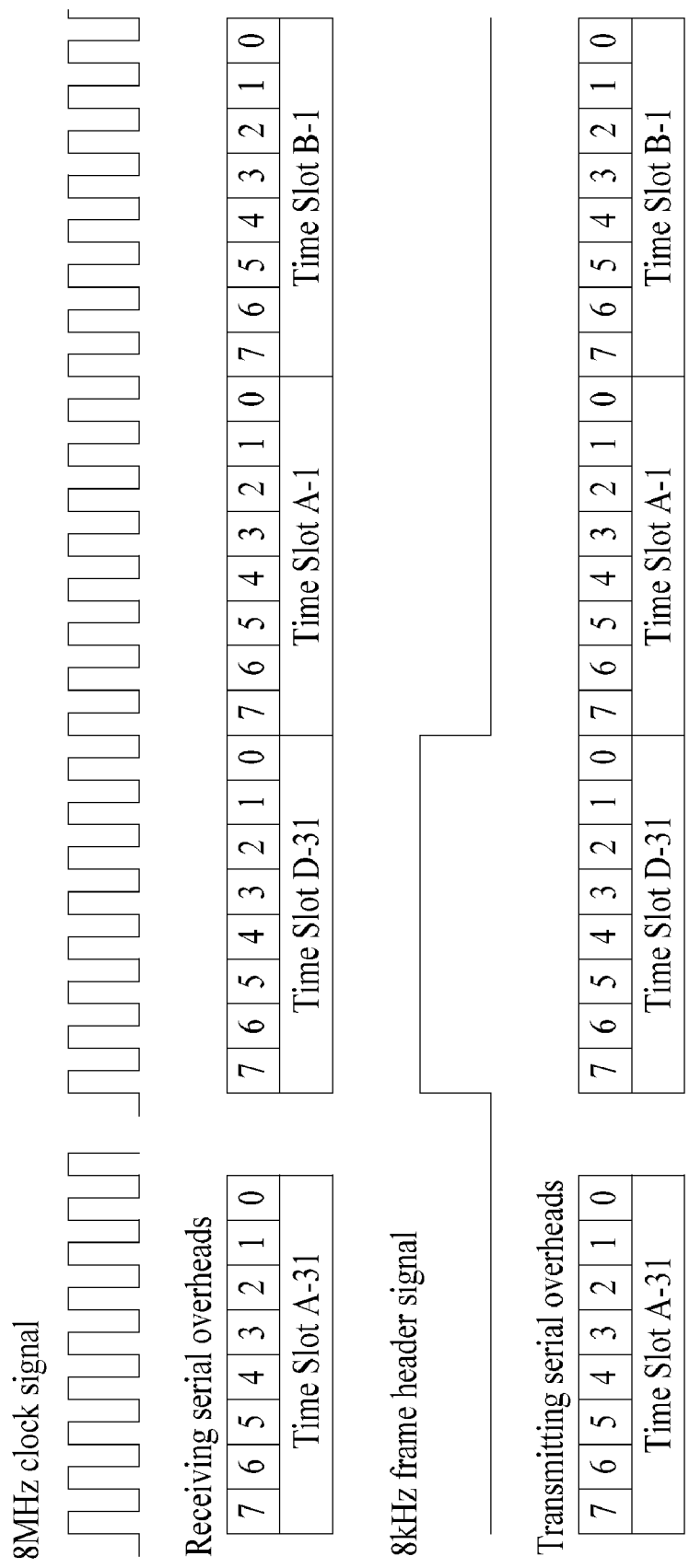
FIG. 6 is a timing diagram of 4 paths overheads, A, B, C, and D, transmitted on a serial overhead bus with a rate of 8 Mb/s in accordance with a preferred embodiment of the present invention.

When the overheads of paths A, B, C, and D are transmitted on the above 8 Mb/s serial overhead bus, the timing diagram of overheads is shown as FIG. 6, including 4 paths of signals including the received serial overheads, transmitted overheads, an 8 MHz clock signal, and an 8 kHz frame-header signal. As shown in FIG. 6, the received serial overheads and the transmitted overheads are both generated by multiplexing the overheads of paths A, B, C, and D in a byte-interleaved mode. Each of the received and transmitted frames on the serial overhead bus includes 32×4 time slots, as shown by Time Slots A-1, B-1, A-31, and D-31 in the figure, wherein each time slot consists of 8 bits, and the advancing edge of the 8 MHz clock signal corresponds to the starting position of each bit in each time slot. The 8 kHz frame-header signal corresponds to a certain path of overheads of paths A, B, C, and D, and is for extracting the overheads of that path, for example, the frame-header signal in the figure corresponds to overheads of path D. In this way, the receiving end can extract the needed overheads based on the clock signal and frame-header signal.

As the above mentioned method for receiving and transmitting overheads, an embodiment of the present invention further defines a checking method for overheads in the method for processing signals in an SDH/SONET system.

In another preferred embodiment of the present invention, the verification of overheads is conducted by a BIP-8 checking algorithm, i.e. generating a BIP-8 check code at the source end, inserting in the designated position of a frame of the serial overhead bus the check code of the last frame, transmitting the frame to a terminal end via the serial overhead bus, and then checking the BIP-8 check code by the terminal end to guarantee a proper transmission of the overheads. It should be noted that other appropriate checking methods may be employed as well in the method for checking overheads, which is within the spirit and scope of the present invention.

Further, the position where a check code is inserted in a serial overhead frame may be designated depending on an actual situation as well. For example, in the above preferred embodiment, Time Slot 31 in the frame of the above 2 Mb/s serial overhead bus may be set as the position where the BIP-8 checking information is loaded, as shown in Table 1; in the frame structure of the above 8 Mb/s serial overhead bus, on the other hand, Time Slot A-31 is set as the type attribute of the function board port; Time Slot B-31 is set as the number attribute of the function board port; and Time Slot D-31 is set as the position where the BIP-8 checking information is loaded; as shown in Table 2. The ID time slot of the 8 Mb/s serial overhead bus may be set as follows:

TABLE 3

| Type of function board opticalport | A-31 | B-31 |
|---|---|---|
| Single optical port | 55 | 0X01 |
| Double optical ports | A5 | 0X02 |
| 4 optical ports | 5A | 0X04 |

An example wherein the rate of the serial overhead bus is 8 Mb/s is hereinafter given to describe the checking method in accordance with an embodiment of the present invention. In the method according to this embodiment, overheads are verified frame by frame. When the signal is received, the overheads are separated by the signal processing unit, and are verified by means of BIP-8, the BIP-8 check code is then inserted in the frame of the above 8 Mb/s serial overheads, and is transmitted to the overhead processing unit for processing, the overhead processing unit verifies the received overheads and compares the result with the check code in the bus, if the result is not the same as the check code, report the result to the software for processing; otherwise, carry out subsequent processing. When the signal is transmitted, the overheads are generated by the overhead processing unit, and are verified by means of BIP-8, the BIP-8 check code is then inserted in the frame of the above 8 Mb/s serial bus, and is transmitted to the signal processing unit, the overhead processing unit verifies the received overheads and compares the result with the check code in the bus, if the result is not the same as the check code, report the result to the software for processing; otherwise, carry out subsequent processing.

In the checking method above, the check value of the last frame, obtained from the BIP-8 check values of all the 32×4 bytes outputted from the last frame, is filled in the BIP-8 check bit. The BIP-8 check code transmitted on the serial overhead bus verifies all the bits of the last frame including the BIP-8 code of the last frame. The significance of checking all the bits of the last frame is to ensure that the number of bits participating in the check is even, which prevents the data line from being constant high, for the check result would be 0 if the data line is all high while the value of the check code is 1. Thus a fault can be identified by the verification.

When there is a Loss of Signal (LOS) alert or a Loss of Frame (LOF) alert on the optical port of the SDH/SONET system, A-31/B-31 needs to be sent out as well with the defined value so as to locate the failure. At this time, the BIP-8 check byte of D-31 should still be outputted; Bytes K1 and K2 are outputted as 0; and the other bytes show as fixed patterns, wherein the fixed pattern of any overhead byte is required not to be constant "0x00" or constant "FF".

Figure 7:
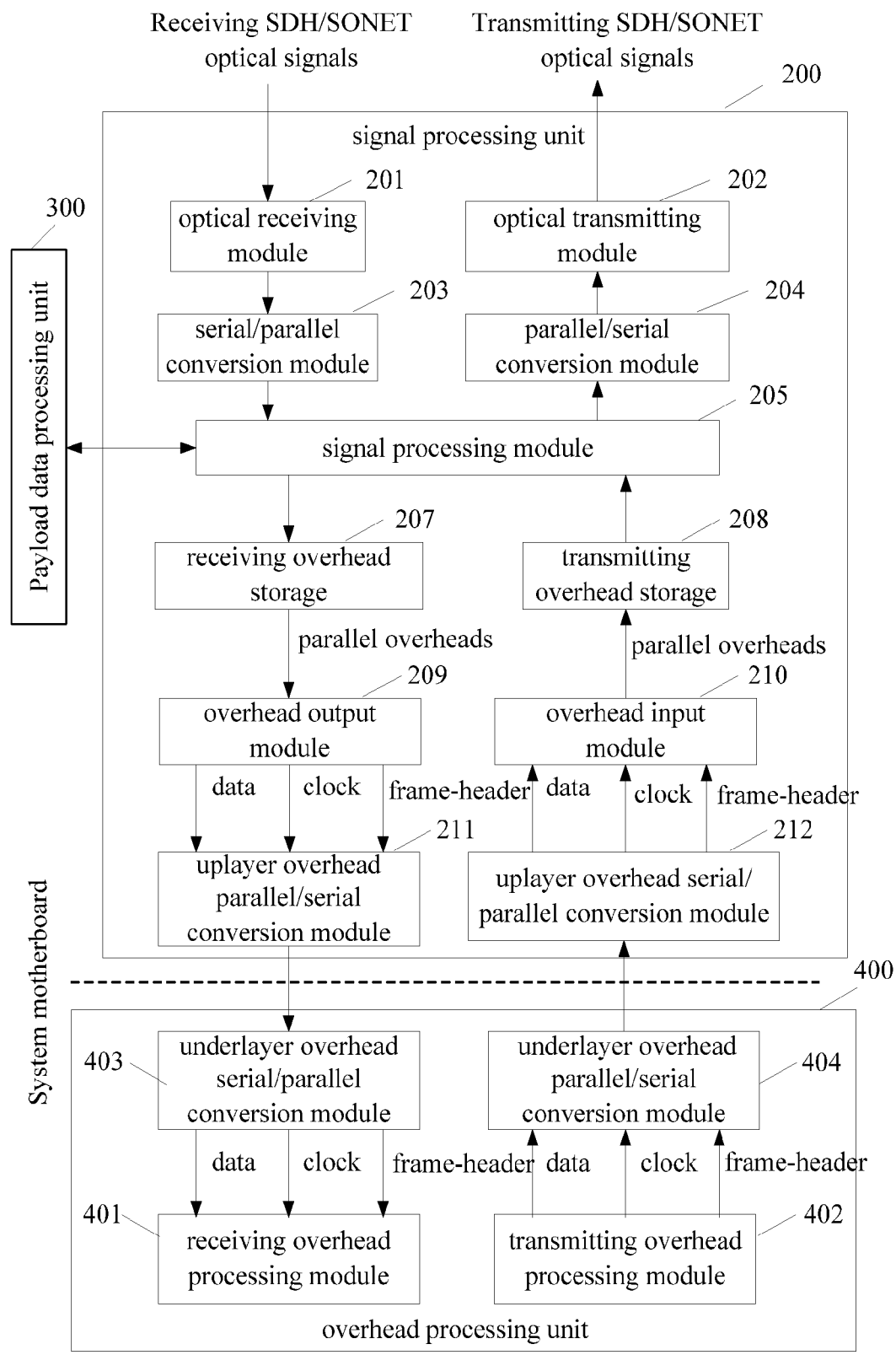
FIG. 7 is a schematic diagram illustrating the architecture of a signal processing device of a SDH/SONET system in accordance with a preferred embodiment of the present invention.

In another aspect, a signal processing device for the SDH/SONET system is also provided. FIG. 7 is a schematic illustrating the signal processing device for the SDH/SONET system. As shown in FIG. 7, the signal processing device includes:

a signal processing unit 200, connected with an overhead processing unit 400 via a serial overhead bus and with a payload data processing unit 300 via a payload data bus, for receiving or transmitting SDH/SONET optical signals, and implementing a separation or a synthesis of the payload data and overheads in SDH/SONET signals;

the payload data processing unit 300, for processing the separated SDH/SONET payload data or generating SDH/SONET payload data for transmission, whose function and implementation are the same as the payload data processing unit in the prior art; and the overhead processing unit 400, for processing the separated SDH/SONET overheads and generating SDH/SONET payload data.

The signal processing unit 200 further includes an upstream overhead parallel/serial conversion module 211 besides the optical receiving module 201, the optical transmitting module 202, the serial/parallel conversion module 203, the parallel/serial conversion module 204, the signal processing module 205, the receiving overhead storage 207, the transmitting overhead storage 208, the overhead output module 209, and the overhead input module 210. The upstream overhead parallel/serial conversion module 211 receives parallel overheads outputted from the overhead output module 209, extracts the overheads necessary for overhead processing, and converts the extracted parallel overheads into serial system overheads before outputting the serial overheads to the overhead processing unit 400 via the serial overhead bus on the system motherboard. Meanwhile, the signal processing unit 200 includes further an upstream overhead serial/parallel conversion module 212, which receives the serial system overheads from the overhead processing unit 400 via the serial overhead bus on the system motherboard, and after an S/P conversion, inserts fixed reserved overheads, reverts the parallel overheads, inserts also the clock signal and frame-header signal corresponding to the overheads, and transmits the overheads to the overhead input module 210.

Meanwhile, the overhead processing unit 400 further includes a downstream overhead serial/parallel conversion module 403 besides the receiving overhead processing module 401 and the transmitting overhead processing module 402. The downstream overhead serial/parallel conversion module 403 is for conducting an S/P conversion of the serial system overheads received from the serial overhead bus on the system motherboard, inserting fixed reserved overheads, reverting the parallel overheads, inserting as well the clock signal and frame-header signal corresponding to the overheads, and transmitting the data to the receiving overhead processing module 401 for processing. The overhead processing unit 400 also includes a downstream parallel/serial conversion module 404, which is for extracting the overheads necessary for overhead processing from the parallel overheads generated by the transmitting overhead processing module 402, converting the overheads into serial system overheads, and transmitting the serial overheads to the upstream overhead serial/parallel conversion module 212 via the serial overhead bus of the system motherboard.

Since the above upstream overhead parallel/serial conversion module 211 and the downstream overhead parallel/serial conversion module 404 have similar functions, they are generally referred to as an overhead transmitting interface conversion unit. Likewise, the above upstream overhead serial/parallel conversion module 212 and the downstream overhead serial/parallel conversion module 403 may be generally referred to as an overhead receiving interface conversion unit.

It should be noted that, after converting the parallel overheads into serial overheads, module 211 and module 404 insert the serial overheads in the frame with a rate of 2 Mb/s or 8 Mb/s described in the above embodiment for transmission.

For the same purpose of implementing bit error verification in the process of overheads transmission to facilitate failure-locating in the system and guaranteeing the system security, the signal processing device for the SDH/SONET system will check the serial system overhead frame transmitted on the serial overhead bus. When receiving signals, the upstream overhead parallel/serial conversion module 211, after converting the parallel overheads into serial overheads, generates a check code in the preset checking mode, and inserts the check code to a designated position of the serial system overhead frame; after receiving the serial overhead frame, the downstream overhead serial/parallel conversion module 403 conducts a check first to ensure that the system overheads are received properly. Likewise, in the transmitting direction, the downstream overhead parallel/serial conversion module 404 generates a check code, and the upstream overhead serial/parallel conversion module 212 verifies the data to ensure that the system overheads are transmitted properly.

The process of transmitting and receiving SDH/SONET signals by the overhead processing device in accordance with preferred embodiments of the present invention is hereinafter specifically described.

In the receiving direction, the signal processing unit 200 receives SDH/SONET optical signals, and after an O/E conversion, an S/P conversion, a separation of the payload data and the overheads from the optical signals as well as a storage of the overheads, the overheads output module 209 inserts an appropriate clock signal and a frame-header signal, and parallelly outputs the data to the upstream parallel/serial conversion module 211. It should be noted that the above process of the O/E conversion, the S/P conversion, the separation as well as the storage is the same as the receiving process of an existing signal processing unit.

The upstream overhead parallel/serial conversion module 211 extracts the overheads necessary for overheads processing from the received parallel overheads, converts the overheads into a serial overhead frame, generates a frame check code, inserts the check code in the overhead frame, and then transmits the overhead frame to the overhead processing unit 400 via the serial bus.

After receiving the serial system overhead frame, the downstream overhead serial/parallel conversion module 403 of overhead processing unit 400 verifies the received data frame first, converts the overhead frame having passed the verification into parallel overheads, inserts fixed reserved overheads, reverts the parallel overheads, adds a corresponding clock and a frame-header, and parallelly outputs the data to the receiving overhead processing module 401 for further processing; for the overhead frame failing to pass the verification, overhead bus failure locating is conducted and an alert message is sent.

In the transmitting direction, the transmitting overhead processing module 402 of the overhead processing unit 400 adds a corresponding clock and a frame-header to the overheads to be transmitted, and parallel transmits the overheads to the downstream overhead parallel/serial conversion module 404; the downstream overhead parallel/serial conversion module 404 extracts the overheads necessary for overheads processing from the received parallel overheads, converts the overheads into a serial system overhead frame, inserts a frame check code in the overhead frame, and then transmits the serial overhead frame to the signal processing unit 200 via the serial bus.

The upstream overhead serial/parallel conversion module 212 in the signal processing unit 200 verifies the received serial data frame first, converts the overhead frame passing the verification into parallel overheads, inserts fixed reserved overheads, reverts the parallel overheads, adds the corresponding clock and frame-header, and parallel output the data to the overhead input module 210; for the overhead frame not passing the verification, overhead-bus failure locating is conducted and an alert message is sent.

After receiving the overheads passing the verification, the overhead input module 210 generates an SDH/SONET optical signal by the process of storing, synthesizing with the payload data, the P/S conversion, and the E/O conversion, and then transmits the generated signal to an optical fibre. It should be noted that the above process of storing, synthesizing, the P/S conversion, and the E/O conversion is the same as the transmitting process of an existing signal processing unit.

In addition, the above signal processing device may be configured with only one pair of receiving and overhead transmitting interface conversion units. The pair of units is connected between the overhead output module 209 and the receiving overhead processing module 401 or between the transmitting overhead processing module 402 and the overhead input module 210, i.e. the above serial overhead bus is used only in a one-way direction of receiving or transmitting for transmitting system overheads while the parallel overhead bus is still used to transmit the system overhead in the other direction.

As can be seen from the foregoing method for processing overheads as well as the signal processing device, it is possible to replace the parallel overhead bus with a serial overhead bus in overheads transmission, thus may reduce the number of bus on the system motherboard and in turn and lower the complexity and difficulty in system design. Meanwhile, the byte-interleaving method is used to ensure the multiplexed transmission of multi-path overheads, which can effectively raise the transmission rate of the overhead bus. Furthermore, with the method and device mentioned above, it is possible to check overheads so as to guarantee the safe transmission between the signal processing module and the overhead processing module.

Preferred embodiments have been given in the above to further describe the objective, solution and merits of the present invention. It should be noted that the foregoing is only preferred embodiments of the invention and is not for limiting the invention. Any modification, equivalent substitution, and improvement without departing from the spirit and principle of the present invention should be covered in the protection scope of the invention.

What is claimed is:

1. A method for processing overheads in an optical communication system, comprising:
    in a signal receiving direction,
    conducting an optical/electrical conversion, a serial/parallel conversion for the received optical signal, separating parallel overheads from the optical signal, extracting overheads necessary for overhead processing from the separated parallel overheads, conducting a parallel/serial conversion for the extracted overheads to generate a serial overhead frame, and outputting the serial overhead frame; and
    receiving the outputted serial overhead frame, conducting a serial/parallel conversion for the serial overheads in the received frame, and reverting parallel overheads for overheads processing by inserting fixed reserved overheads into the overheads which are obtained by conducting the serial/parallel conversion for the serial overheads in the received frame;

in a signal transmitting direction, generating parallel overheads to be transmitted, extracting overheads necessary for overheads processing from the generated overheads, conducting a parallel/serial conversion for the extracted overheads to generate a serial overhead frame, and outputting the serial overhead frame; and receiving the serial overhead frame outputted, conducting a serial/parallel conversion for the serial overheads in the received frame, reverting the parallel overheads by inserting fixed reserved overheads into the overheads which are obtained by conducting the serial/parallel conversion for the serial overheads in the received frame, combining the reverted overheads with payload data of the system, conducting a parallel/serial conversion, an electrical/optical conversion, generating and transmitting obtained optical signals.

2. The method according to claim 1, wherein the overheads necessary for overheads processing comprise: overheads carrying the information of management and maintenance.

3. The method according to claim 2, wherein the information of management and maintenance comprises: voice channel information, user channel information, communication channel information, automatic protection switching information and information of reserved overheads defined by the system itself.

4. The method according to claim 1, wherein the parallel/serial conversion comprises: inserting the extracted overheads necessary for overheads processing in a preset serial overhead frame.

5. The method according to claim 4, wherein the serial overhead frame refers to a frame formed by multiplexing at least one 2Mb/s serial data bus with 32 time slots in a byte-interleaved multiplexing mode.

6. The method according to claim 1, further comprising:
before outputting the serial overhead frame, checking the serial overheads, generating a check code, and inserting the check code in the overhead frame; and
after receiving the serial overhead frame, checking the serial overheads in the received serial overhead frame, comparing the check result with the check code in the serial overhead frame, if the result is correct, reverting the serial overheads to parallel overheads and implementing the subsequent processes; otherwise, sending an alert message.

7. The method according to claim 6, wherein the step of checking comprises:
conducting an 8-bit bit-interleaved parity verification for the overheads.

8. The method according to claim 1, further comprising:
before outputting the serial overhead frame, checking the serial overheads, generating a check code, and inserting the check code in the serial overhead frame; and
after receiving the serial overhead frame, checking the serial overheads in the received serial overhead frame, comparing the check result with the check code in the serial overhead frame, if the result is correct, reverting the serial overheads to parallel overheads and implementing the subsequent processes; otherwise, sending an alert message.

9. The method according to claim 8, wherein the step of checking comprises:
conducting an 8-bit bit-interleaved parity verification for the overheads.

10. A device for processing system signals, comprising:
a signal processing unit, for receiving or transmitting optical signals, and implementing a separation or synthesis for payload data and overheads in the signals;
a payload data processing unit, for processing the separated payload data or generating the payload data for transmission; and
an overhead processing unit, for processing the separated overheads or generating the overheads for transmission;
a first pair of overhead transmitting interface conversion unit and overhead receiving interface conversion unit connected with both the signal processing unit and the overhead processing unit in parallel modes; wherein,
the first pair of overhead transmitting interface conversion unit and overhead receiving interface conversion unit comprises a first overhead transmitting interface conversion unit and a first overhead receiving interface conversion unit, and the output of the first overhead transmitting interface conversion unit connects to the input of the first overhead receiving interface conversion unit through a serial overhead bus; wherein,
the first overhead transmitting interface conversion unit is used for extracting overheads necessary for overhead processing from the inputted parallel overheads, conducting a parallel/serial conversion for the extracted overheads to generate serial overheads, and transmitting the serial overheads to the overhead receiving interface conversion unit; and
the first overhead receiving interface conversion unit is used for receiving the serial overheads from the overhead transmitting interface conversion unit, conducting a serial/parallel conversion for the received serial overheads, reverting the parallel overheads by inserting fixed reserved overheads into the overheads which are obtained by conducting the serial/parallel conversion for the received serial overheads, and outputting the parallel overheads.

11. The device according to claim 10, wherein the input of the first overhead transmitting interface conversion unit is connected to the output of the signal processing unit; and the output of the first overhead receiving interface conversion unit is connected to the input of the overhead processing unit.

12. The device according to claim 10, wherein the input of the first overhead transmitting interface conversion unit is connected to the output of the overhead processing unit; and the output of the first overhead receiving interface conversion unit is connected to the input of the signal processing unit.

13. The device according to claim 10, further comprising:
a second pair of overhead transmitting interface conversion unit and overhead receiving interface conversion unit connected with both the signal processing unit and overhead processing unit in parallel modes;
wherein the first pair of overhead transmitting interface conversion unit and overhead receiving interface conversion unit is connected to the bus between the output of the signal processing unit and the input of the overhead processing unit; and the second pair of overhead transmitting interface conversion unit and overhead receiving interface conversion unit is connected to the bus between the output of the overhead processing unit and the input of the signal processing unit.

* * * * *